United States Patent
Wei et al.

(10) Patent No.: US 10,272,614 B2
(45) Date of Patent: Apr. 30, 2019

(54) EXTRUSION DEVICE OF THREE-DIMENSIONAL PRINTER AND OPTICAL DETECTION MECHANISM THEREOF (71) Applicant: TECO IMAGE SYSTEMS CO., LTD., Taipei (TW)

(72) Inventors: Yao-Ming Wei, Taipei (TW); Ken-Te Chou, Taipei (TW); Ting-Chun Chen, Taipei (TW); Yu-Jen Chang, Taipei (TW)

(73) Assignee: TECO IMAGE SYSTEMS CO., LTD., Taipei (TW)

( * ) Notice: Subject to any disclaimer, the term of this patent is extended or adjusted under 35 U.S.C. 154(b) by 327 days.

(21) Appl. No.: 15/234,573

(22) Filed: Aug. 11, 2016

(65) Prior Publication Data

US 2017/0355131 A1   Dec. 14, 2017

(30) Foreign Application Priority Data

Jun. 8, 2016 (TW) .............................. 105118284 A (51) Int. Cl.
*B29C 64/124* (2017.01)
*B29C 64/20* (2017.01)
(Continued)

(52) U.S. Cl.
CPC ............ *B29C 64/124* (2017.08); *B29C 64/20* (2017.08); *B29C 64/209* (2017.08);
(Continued)

(58) Field of Classification Search
CPC ... B29C 64/124; B29C 64/209; B29C 64/393; B29C 64/20; B29C 47/0823;
(Continued)

(56) References Cited

U.S. PATENT DOCUMENTS

2014/0328963 A1\* 11/2014 Mark ................... B29C 64/386
425/143

FOREIGN PATENT DOCUMENTS

CN    203496156 U    3/2014
CN    203805324 U    9/2014
(Continued)

OTHER PUBLICATIONS

English translation CN203805324, 2014.\*

*Primary Examiner* — Joseph S Del Sole
*Assistant Examiner* — Mohamed K Ahmed Ali
(74) *Attorney, Agent, or Firm* — Kirton McConkie; Evan R. Witt (57) ABSTRACT An extrusion device of a three-dimensional printer includes a ratchet, a spray head, an idler, a feeding wheel and an optical detection mechanism. The spray head and the idler are disposed adjacent to the ratchet. A thermofusible material is provided to the spray head by the feeding wheel. The optical detection mechanism includes a guiding element and an optical detecting assembly. The guiding element is disposed between the ratchet and the feeding wheel along a feeding path. The optical detecting assembly is disposed adjacent to the guiding element. The thermofusible material is guided by the guiding element and partially disposed on a detecting area. A waveband light is emitted to the detecting area by the optical detecting assembly. The image produced by the reflection of the waveband light reflected by the detecting area is detected by the optical detecting assembly. Therefore, the operation of the equipment is completely monitored.

8 Claims, 8 Drawing Sheets (51) Int. Cl.
  *B29C 64/393* (2017.01)
  *B33Y 30/00* (2015.01)
  *B33Y 50/02* (2015.01)
  *B29C 64/209* (2017.01)

(52) U.S. Cl.
  CPC ............ *B29C 64/393* (2017.08); *B33Y 30/00* (2014.12); *B33Y 50/02* (2014.12)

(58) Field of Classification Search
  CPC .............. B29C 47/585; B29C 47/6031; B29C 47/1018; B29C 47/10; B33Y 30/00; B33Y 50/02
  See application file for complete search history.

(56) References Cited

FOREIGN PATENT DOCUMENTS

| | | |
|---|---|---|
| CN | 104129079 A | 11/2014 |
| CN | 104552946 A | 4/2015 |
| TW | 201607722 A | 3/2016 |

\* cited by examiner

EXTRUSION DEVICE OF THREE-DIMENSIONAL PRINTER AND OPTICAL DETECTION MECHANISM THEREOF

CROSS-REFERENCE TO RELATED APPLICATION

This application claims priority from Taiwan Patent Application No. TW 105118284, filed on Jun. 8, 2016, the entire contents of which are incorporated herein by reference for all purposes.

FIELD OF THE INVENTION

The present invention relates to an extrusion device, and more particularly to an extrusion device of a three-dimensional printer and an optical detection mechanism thereof.

BACKGROUND OF THE INVENTION

In recent years, three-dimensional (3D) printing technologies, also referred as additive manufacturing (AM) technologies are rapidly developed and become increasingly popular. A fused deposition modeling (FDM) technology is commonly used in much equipment. In accordance with the operating principle of the AM technology, a three-axis transmission system or a single-axis transmission system and nozzles cooperate to extrude a plastic material or other build material in order to produce a three-dimensional object. The material is usually held by a ratchet and driven to the nozzle with the friction force. When a spray head is heated to a specific temperature, the material is melted so as to be extruded as a thread form from the small spray head, thereby filling up the slicer zone and formed layer by layer.

Since the method of inputting the material is implemented by holding and pushing the material with the ratchet, the unpredictable abnormal input issues are easy to occur (e.g. the material is knotted, the material wire is broken, the material is exhausted, the ratchet is skidded and the spray head is blocked). When the abnormal input issues occur during printing, the issues cannot be instantly known by most of the conventional 3D printers. It causes that the equipment is continuously operated, so a carbon accumulation with empty burning of the spray head is occurred and the ratchet is milled.

As shown in the application CN 203496156U, an error feeding detection device of a 3D printer is disclosed. Although the rotational speed of the coupling wheel can be monitored by the speed sensor disposed inside the coupling wheel, only the inputting status can be known in this manner. The issues that the material is knotted, the material wire is broken, the material is exhausted, the ratchet is skidded and the spray head is blocked cannot be instantly known in the first time. The common problems and drawbacks of the conventional 3D printers cannot be effectively solved.

Therefore, there is a need of provides an extrusion device of a three-dimensional printer and an optical detection mechanism thereof in order to overcome the above drawbacks.

SUMMARY OF THE INVENTION

Some embodiments of the present invention are to provide an extrusion device of a three-dimensional printer and an optical detection mechanism thereof in order to overcome at least one of the above-mentioned drawbacks encountered by the prior arts.

The present invention provides an extrusion device of a three-dimensional printer and an optical detection mechanism thereof. By disposing the optical detection mechanism, the image produced by the reflection of a waveband light, which is reflected by the thermofusible material or the guiding element in the detecting area, can be detected, so that the velocity and the movement of the thermofusible material can be monitored, and the exist of the thermofusible material can be detected. Therefore, the operation of the equipment is completely monitored.

The present invention also provides an extrusion device of a three-dimensional printer and an optical detection mechanism thereof. Since the optical detection mechanism is disposed between the feeding wheel and the ratchet and the idler, no matter where an abnormal issue occurs, the abnormal issue can be detected and the equipment can be appropriately stopped. The print will resume after the abnormal issue is removed. Meanwhile, the problems and the drawbacks of reprinting caused by the failure of the previous print is avoided. Not only the time is economized, but also the efficiency of operation is enhanced.

In accordance with an aspect of the present invention, there is provided an extrusion device of a three-dimensional printer. The extrusion device of the three-dimensional printer includes a ratchet, a spray head, an idler, a feeding wheel and an optical detection mechanism. The spray head is disposed adjacent to the ratchet. The idler is disposed adjacent to the ratchet. A thermofusible material is jointly held by the ratchet and the idler, and the thermofusible material is pressurized by the idler so as to be tightly contacted with the ratchet. The thermofusible material is provided to the spray head through the ratchet and the idler by the feeding wheel. The optical detection mechanism includes a guiding element and an optical detecting assembly. The guiding element is disposed between the ratchet and the feeding wheel along a feeding path. The optical detecting assembly is disposed adjacent to the guiding element. When the ratchet is rotated, the thermofusible material is driven through the guiding element, the ratchet and the idler by the friction force between the ratchet and the thermofusible material and then extruded out by the spray head. The thermofusible material is guided by the guiding element so as to be partially disposed on a detecting area. A waveband light is emitted to the detecting area by the optical detecting assembly. The image produced by the reflection of the waveband light, which is reflected by the detecting area, is detected by the optical detecting assembly.

In accordance with another aspect of the present invention, there is provided an optical detection mechanism of an extrusion device of a three-dimensional printer. The extrusion device includes a ratchet, a spray head, an idler and a feeding wheel. The spray head and the idler are disposed adjacent to the ratchet. A thermofusible material is jointly held by the idler and the ratchet and provided to the spray head through the ratchet and the idler by the feeding wheel. The optical detection mechanism includes a guiding element and an optical detecting assembly disposed adjacent to the guiding element. The thermofusible material is guided by the guiding element so as to be partially disposed on a detecting area. A waveband light is emitted to the detecting area by the optical detecting assembly. The image produced by the reflection of the waveband light, which is reflected by the detecting area, is detected by the optical detecting assembly.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
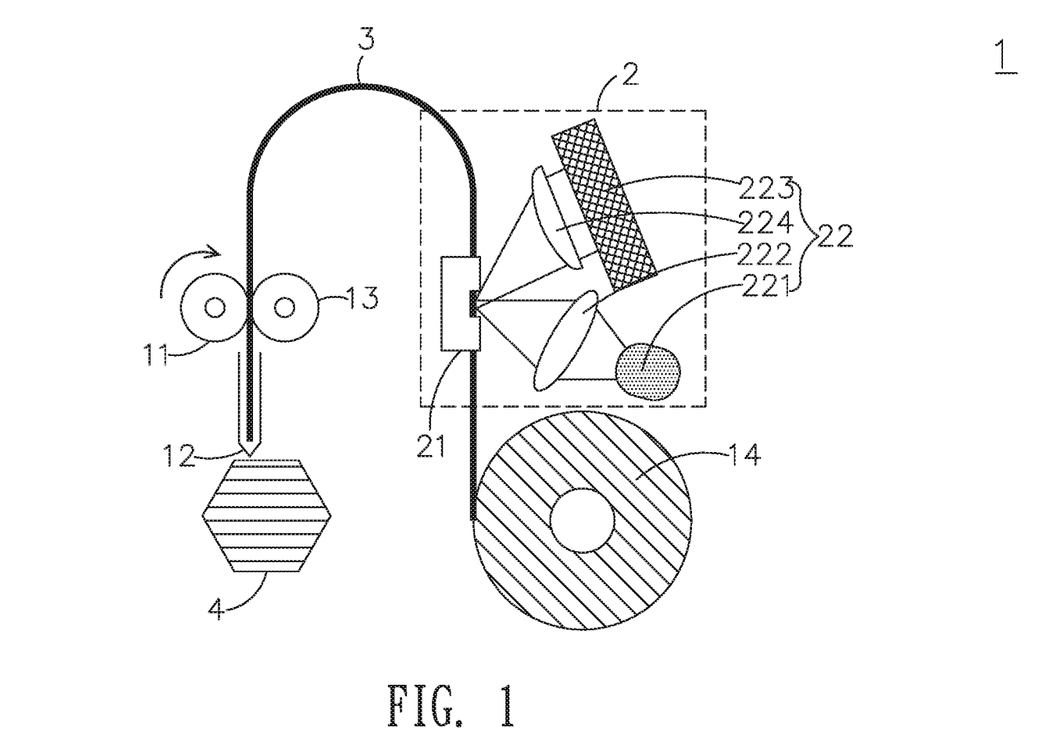
FIG. 1 schematically illustrates the structure of an extrusion device of a three-dimensional printer according to an embodiment of the present invention.
Figure 2:
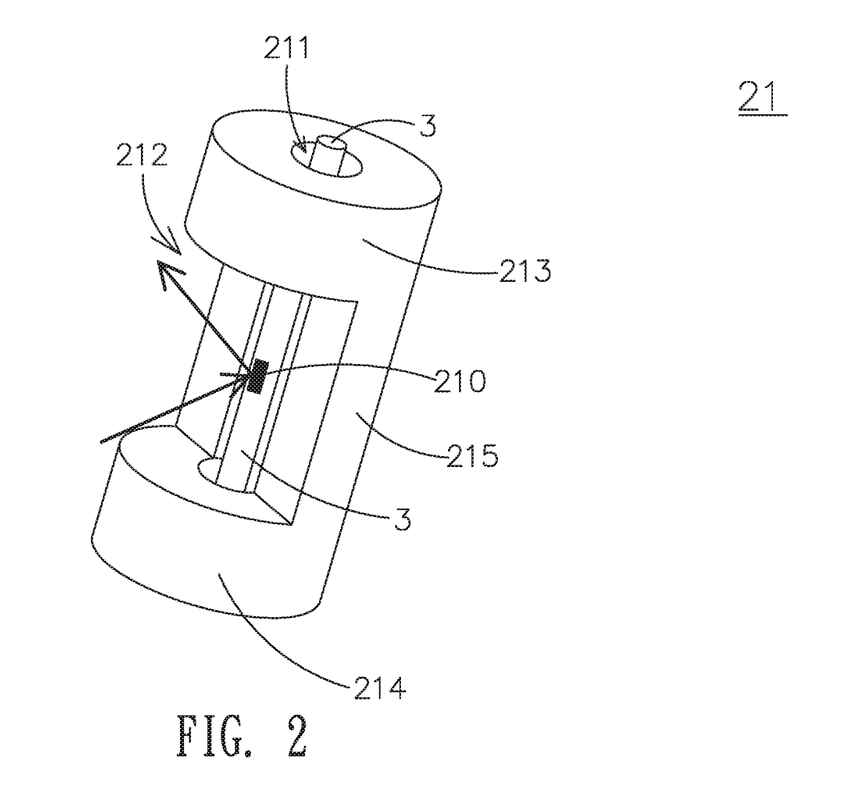
FIG. 2 schematically illustrates the detailed structure of a guiding element shown in FIG. 1.

Please refer to FIG. 1 AND FIG. 2. FIG. 1 schematically illustrates the structure of an extrusion device of a three-dimensional printer according to an embodiment of the present invention. FIG. 2 schematically illustrates the detailed structure of a guiding element shown in FIG. 1. The extrusion device 1 of the three-dimensional printer includes a ratchet 11, a spray head 12, an idler 13, a feeding wheel 14 and an optical detection mechanism 2. The spray head 12 is disposed adjacent to the ratchet 11. The idler 13 is disposed adjacent to the ratchet 11. A thermofusible material 3 is jointly held by the ratchet 11 and the idler 13, and the thermofusible material 3 is pressurized by the idler 13 so as to be tightly contacted with the ratchet 11. The thermofusible material 3 is preferably a thermofusible thread, but not limited herein, and is continuously provided to the spray head 12 through the ratchet 11 and the idler 13 by the feeding wheel 14. The optical detection mechanism 2 includes a guiding element 21 and an optical detecting assembly 22. The guiding element 21 is disposed between the ratchet 11 and the feeding wheel 14 along a feeding path. Certainly, the guiding element 21 can be regarded as being disposed between the idler 13 and the feeding wheel 14 along the feeding path. The optical detecting assembly 22 is disposed adjacent to the guiding element 21. When the ratchet 11 is rotated, the thermofusible material 3 is driven through the guiding element 21, the ratchet 11 and the idler 13 by the friction force between the ratchet 11 and the thermofusible material 3 and then extruded out by the spray head 12, so that a print object 4 is printed and formed layer by layer. The thermofusible material 3 is guided by the guiding element 21 so as to be partially disposed on a detecting area 210. A waveband light is emitted to the detecting area 210 by the optical detecting assembly 22. The image produced by the reflection of the waveband light, which is reflected by the detecting area 210, is detected by the optical detecting assembly 22. In particular, when the extrusion device 1 of the three-dimensional printer is normally operated, the image produced by the reflection of the waveband light, which is reflected by the thermofusible material 3 in the detecting area 210 is detected. On the other hand, when the extrusion device 1 of the three-dimensional printer is abnormally operated, for example when the thermofusible material 3 is exhausted, the image produced by the reflection of the waveband light, which is reflected by the guiding element 210 itself in the detecting area 210, is detected. Therefore, the velocity and the movement of the thermofusible material 3 can be monitored, and the exist of the thermofusible material 3 can be detected, hence the operation of the equipment is completely monitored.

In some embodiments, the optical detecting assembly 22 of the optical detection mechanism 2 of the extrusion device 1 of the three-dimensional printer of the present invention includes a solid-state light-emitting element 221, a first lens 222, a detecting element 223 and a second lens 224. The solid-state light-emitting element 221, the first lens 222, the detecting element 223 and the second lens 224 are preferred to be integrated as an optical mouse module, but not limited thereto. The solid-state light-emitting element 221 can be a light-emitting diode or a LASER diode, but not limited herein. A waveband light (which is illustrated as the line and arrow toward the detecting area 210 shown in FIG. 2) is emitted by the solid-state light-emitting element 221. The solid-state light-emitting element 221 is disposed on one side of the detecting area 210 receiving the waveband light. The first lens is disposed between the solid-state light-emitting element 221 and the guiding element 21 for focusing the waveband light on the detecting area 210. The detecting element 223 is disposed on one side of the detecting area 210 reflecting the waveband light (which is illustrated as the line and arrow away from the detecting area 210 shown in FIG. 2) relative to the solid-state light-emitting element 221. In other words, the detecting element 223 is disposed on the other side of the detecting area opposite to the solid-state light-emitting element 221. The second lens is disposed between the detecting element 223 and the guiding element 21 for collecting lights toward the detecting element 223. The image produced by the reflection of the waveband light reflected by the detecting area 210 is detected by the detecting element 223.

Please refer to FIG. 2 again. The guiding element 21 has a penetration groove 211. The thermofusible material 3 is penetrated through the penetration groove 211 and limited by the penetration groove 211 so as to be partially disposed on the detecting area 210. Furthermore, the guiding element 21 further has a slot 212, and the slot 212 is partially formed on the penetration groove 211 for commonly defining the detecting area 210 with the penetration groove 211. In some embodiments, the guiding element 21 of the optical detection mechanism 2 of the extrusion device 1 of the three-dimensional printer further has a first portion 213, a second portion 214 and a connect portion 215. The penetration groove 211 is penetrated through the first portion 213, the connect portion 215 and the second portion 214 in sequence. The slot 212 is formed on the connect portion 215, and the detecting area 210 is located on the center of an overlapped portion of the connect portion 215, the penetration groove 211 and the slot 212, but not limited herein.

Figure 3:
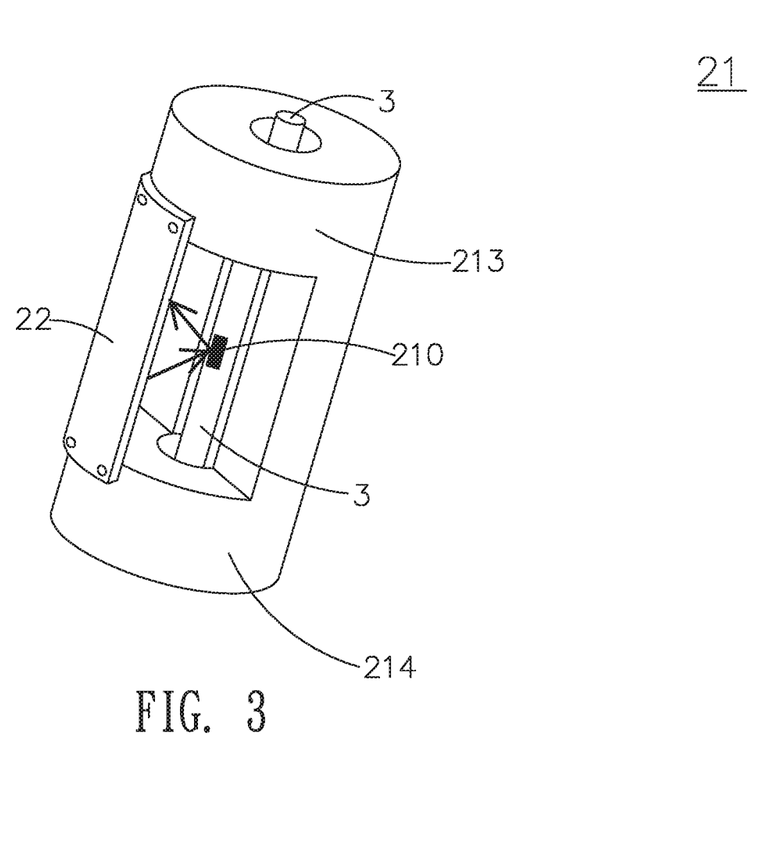
FIG. 3 schematically illustrates the structure of an optical detection mechanism of an extrusion device of a three-dimensional printer according to an embodiment of the present invention.

Please refer to FIG. 3. FIG. 3 schematically illustrates the structure of an optical detection mechanism of an extrusion device of a three-dimensional printer according to an embodiment of the present invention. In some embodiments, the optical detecting assembly 22 is simultaneously fixed on the first portion 213 and the second portion 214 of the guiding element 21. For example, if the optical detecting assembly 22 is an optical mouse module, or the solid-state light-emitting element 221, the first lens 222, the detecting element 223 and the second lens 224 of the optical detecting assembly 22 are integrated as an optical mouse module, the optical detecting assembly 22 can be directly fixed on the first portion 213 and the second portion 214 of the guiding element 21 through a fixing manner or a fixing element (not shown).

In some embodiments, the velocity, the movement and the exist of the thermofusible material 3 can be monitored and detected through the optical detection mechanism 2. In particular, it is preferred to utilize a control unit (not shown, e.g. a microcontroller or a processor) and set a threshold value for controlling. Meanwhile, when the happening of an abnormal issue is monitored, the flow chart applying the extrusion device 1 of the three-dimensional printer is preferred to pause the equipment, handle the abnormal issue and then recover to continuously operated, but not limited herein.

As illustrated in FIG. 4 to FIG. 8, a cross is drawn to show the position that the abnormal issue occurs or the position that the thermofusible material 3 is broken.

Figure 4:
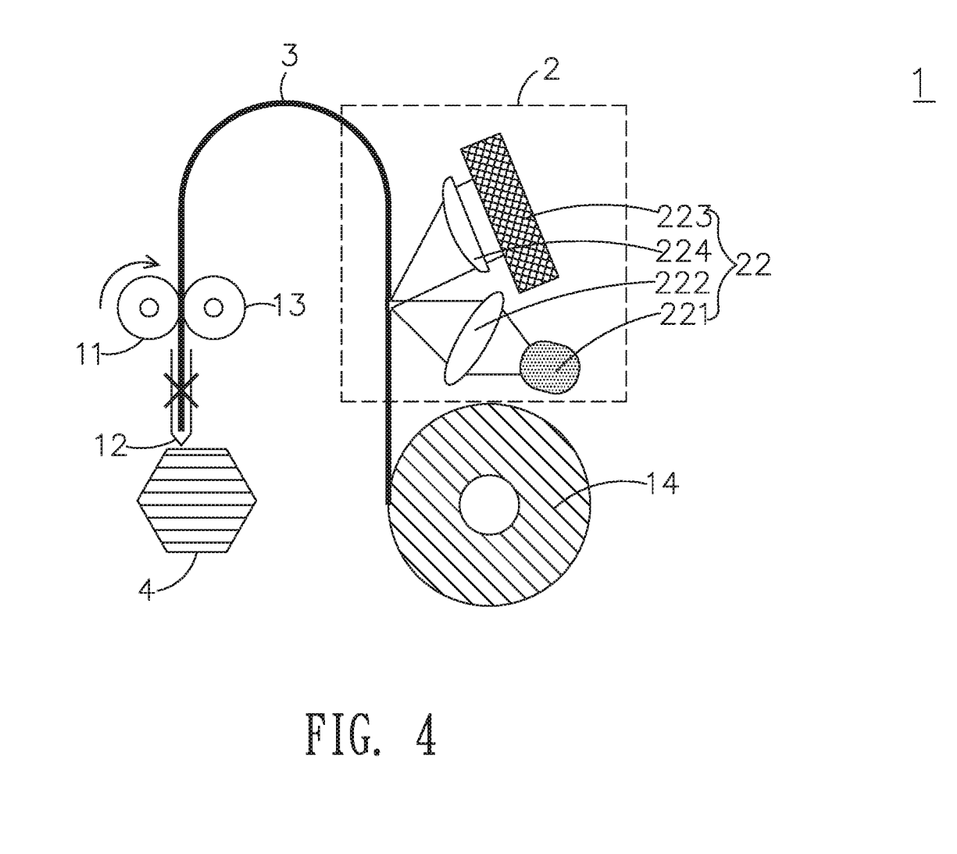
FIG. 4 schematically illustrates the situation that the spray head of the extrusion device of the three-dimensional printer of the present invention is blocked.

Please refer to FIG. 4. FIG. 4 schematically illustrates the situation that the spray head of the extrusion device of the three-dimensional printer of the present invention is blocked. As shown in FIG. 4, when the spray head 12 of the extrusion device 1 of the three-dimensional printer is blocked (e.g. caused by the lack of gap of the first layer or the accumulation of carbon after a long-time operation), the pressure of the spray head 12 is too large, so that the thermofusible material 3 cannot be continuously pushed by the ratchet 11. The thermofusible material 3 is stopped. At this time, the image detected by the detecting element 223 is a fixed image. A firmware will judge and find out if the thermofusible material 3 is stopped moving. It can be judged if an abnormal issue is occurred according to the time or the distance of the stop. If the result is Ture (i.e. the abnormal issue does occur), the equipment can be paused till the abnormal issue is excluded.

Figure 5:
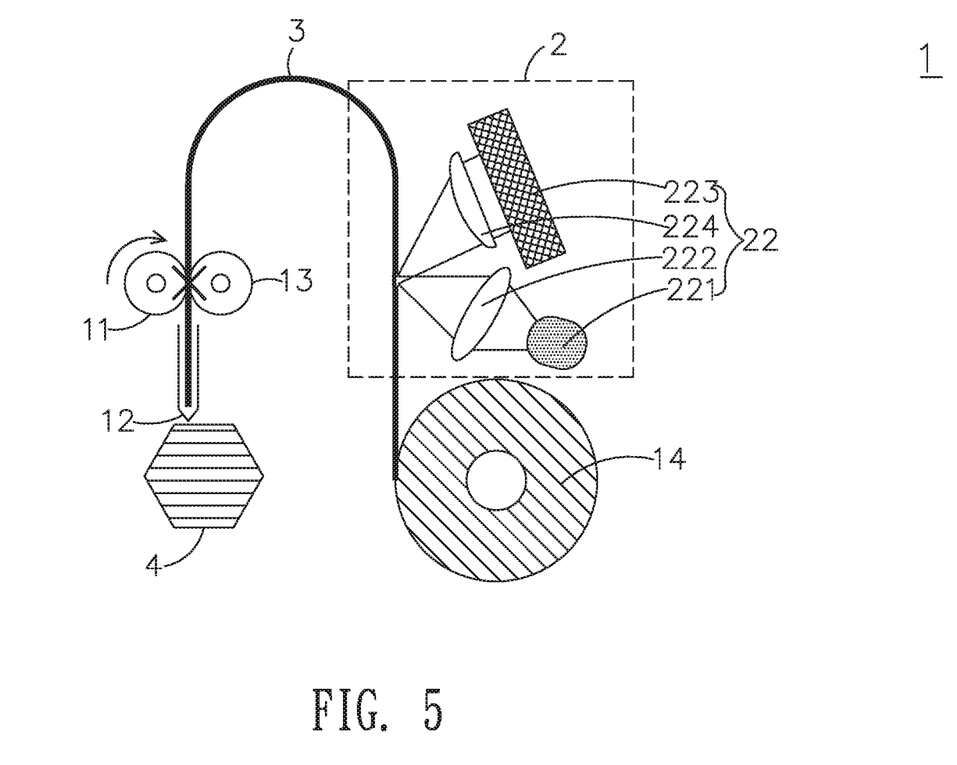
FIG. 5 schematically illustrates the situation that the ratchet of the extrusion device of the three-dimensional printer of the present invention is milled and skidded.

Please refer to FIG. 5. FIG. 5 schematically illustrates the situation that the ratchet of the extrusion device of the three-dimensional printer of the present invention is milled and skidded. As shown in FIG. 5, After a long-time operation of the extrusion device 1 of the three-dimensional printer of the present invention, the ratchet 11 is milled so as to significantly reduce the friction force between the ratchet 11 and the thermofusible material 3, so that the thermofusible material 3 cannot be pushed by the ratchet 11. The thermofusible material 3 will be stopped, or the thermofusible material 3 will move through a distance less than a preset distance. At this time, the image detected by the detecting element 223 is a fixed image or a continuous image having little displacements. The firmware will judge and find out if the thermofusible material 3 is stopped moving or moved through a distance less than a preset distance. It can be judged if an abnormal issue is occurred according to the time or the distance of the stop. If the result is Ture, the equipment can be paused till the abnormal issue is excluded.

Figure 6:
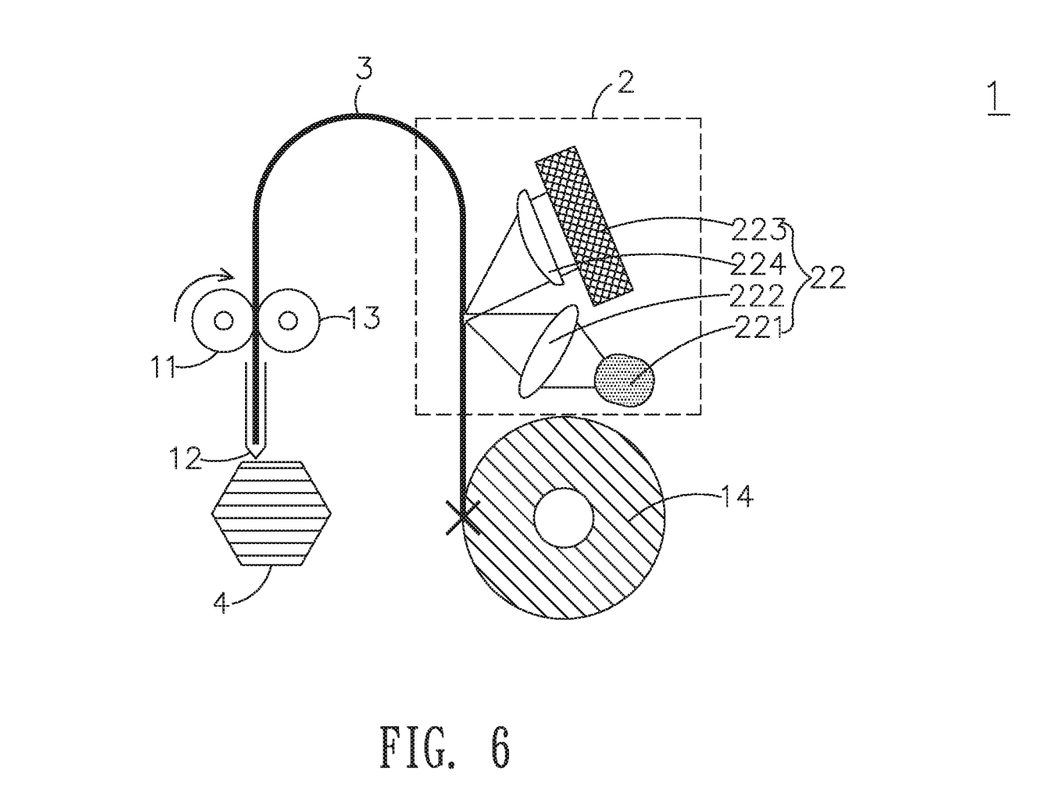
FIG. 6 schematically illustrates the situation that the thermofusible material of the extrusion device of the three-dimensional printer of the present invention is stuck.

Please refer to FIG. 6. FIG. 6 schematically illustrates the situation that the thermofusible material of the extrusion device of the three-dimensional printer of the present invention is stuck. As shown in FIG. 6, it has a little probability that the thermofusible material 3 is knotted during producing. A knotted thermofusible material will cause a large friction force of the feeding wheel 14 that the driving force of the ratchet 11 cannot overcome, which means the thermofusible material 3 is stuck. At this time, the image detected by the detecting element 223 is a fixed image. The firmware will judge and find out if the thermofusible material 3 is stopped moving. It can be judged if an abnormal issue is occurred according to the time or the distance of the stop. If the result is Ture, the equipment can be paused till the abnormal issue is excluded.

Figure 7:
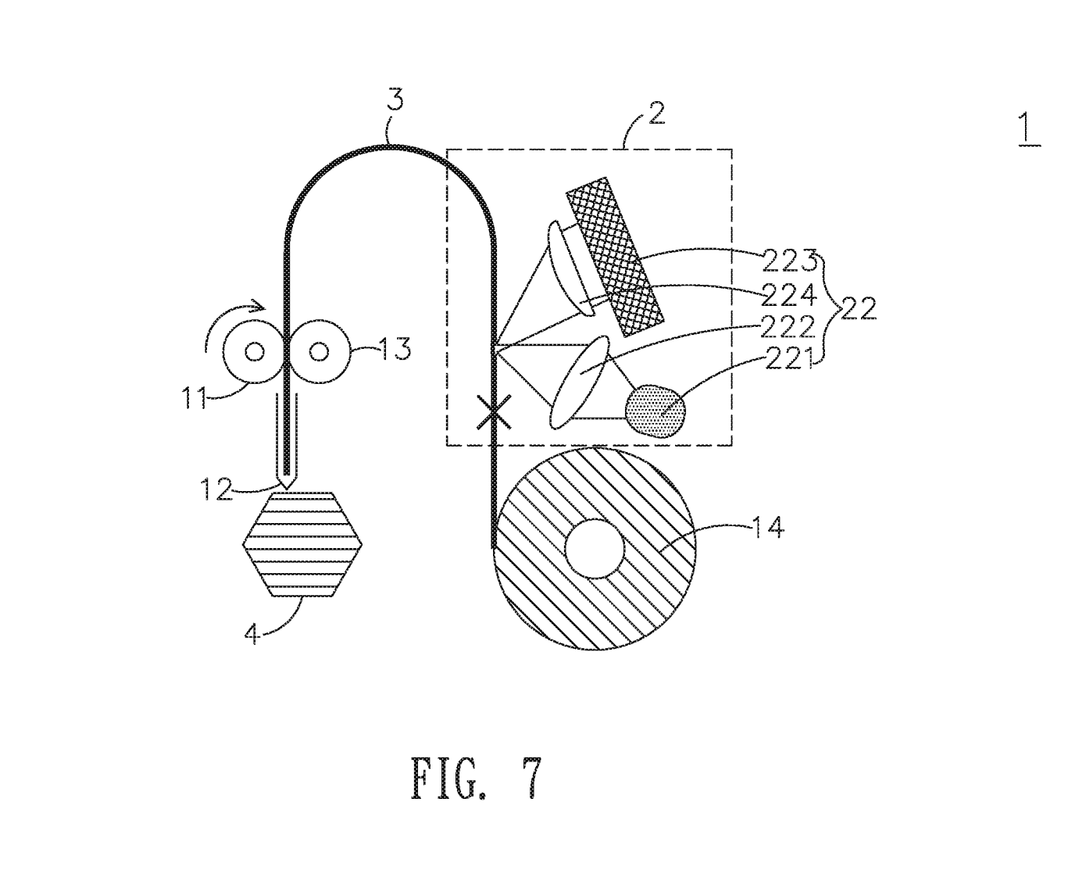
FIG. 7 schematically illustrates the situation that the thermofusible material of the extrusion device of the three-dimensional printer of the present invention is broken between the optical detection mechanism and the feeding wheel.

Please refer to FIG. 7. FIG. 7 schematically illustrates the situation that the thermofusible material of the extrusion device of the three-dimensional printer of the present invention is broken between the optical detection mechanism and the feeding wheel. As shown in FIG. 7, when the thermofusible material 3 is not used for a long time, the thermofusible material 3 will absorb the water in the air. That is, an embrittlement of the thermofusible material 3 is occurred, and it causes that the thermofusible material 3 is easy to be broken. If the thermofusible material 3 of the extrusion device 1 of the three-dimensional printer of the present invention is broken between the feeding wheel 14 and the detecting area 210, the thermofusible material 3 is still brought into the spray head 12 by the ratchet 11. However, after the position of the break is departed from the detecting area 210, none of a clear image is detected by the detecting element 223, so that it can be judged if an abnormal issue is occurred according to whether the thermofusible material 3 exists in the feeding path or not. If the result is Ture, the equipment can be paused till the abnormal issue is excluded.

Figure 8:
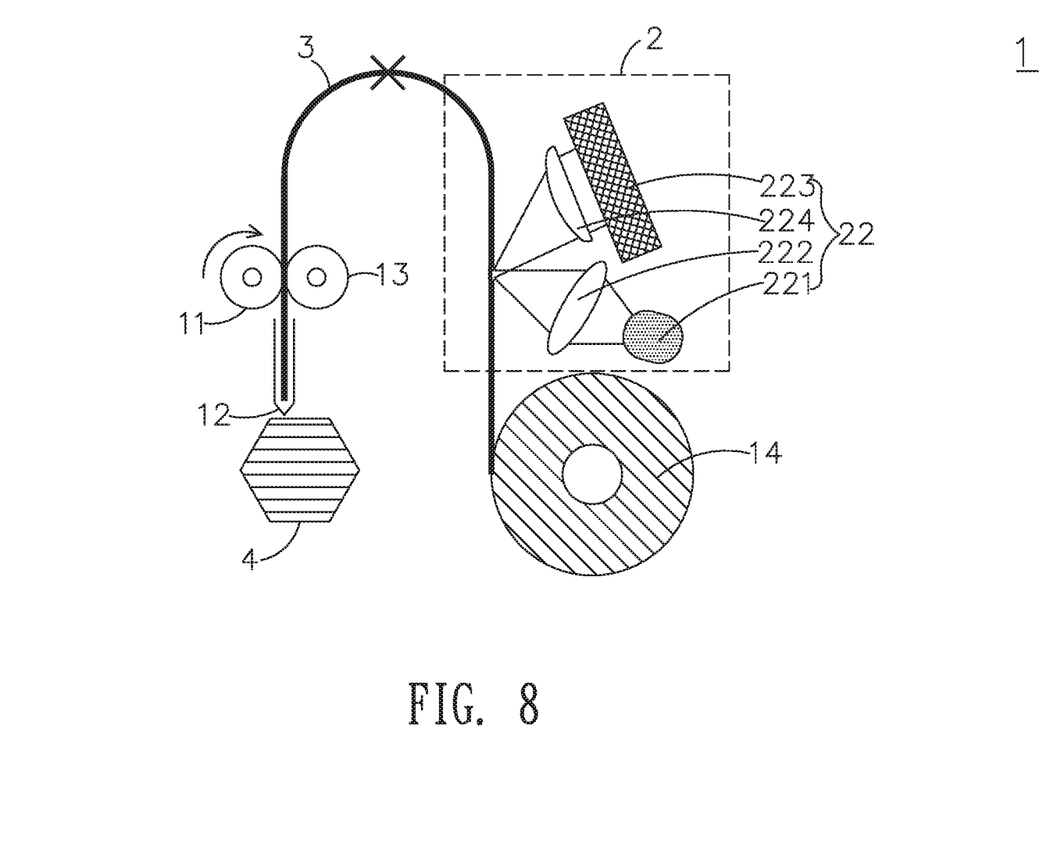
FIG. 8 schematically illustrates the situation that the thermofusible material of the extrusion device of the three-dimensional printer of the present invention is broken between the optical detection mechanism, and the ratchet and the idler.

Please refer to FIG. 8. FIG. 8 schematically illustrates the situation that the thermofusible material of the extrusion device of the three-dimensional printer of the present invention is broken between the optical detection mechanism, and the ratchet and the idler. As shown in FIG. 8, if the thermofusible material 3 of the extrusion device 1 of the three-dimensional printer of the present invention is broken between the detecting area 210 and the ratchet 11, the thermofusible material 3 is still brought into the spray head 12 by the ratchet 11. At this time, the image detected by the detecting element 223 is a fixed image. The firmware will judge and find out if the thermofusible material 3 is stopped moving. It can be judged if an abnormal issue is occurred according to the time or the distance of the stop of the thermofusible material 3. If the result is Ture, the equipment can be paused till the abnormal issue is excluded.

Therefore, via utilizing the optical detection mechanism 2 of the present invention, the lack of the conventional design is improved. Especially in a long-time print, when the unpredictable abnormal issues are occurred, the failure of print and the block of the spray head caused by abnormal inputting of the material can be effectively solved. The purpose of continuous print can be achieved.

From the above description, the present invention provides an extrusion device of a three-dimensional printer and an optical detection mechanism thereof. By disposing the optical detection mechanism, the image produced by the reflection of a waveband light, which is reflected by the thermofusible material or the guiding element in the detecting area, can be detected, so that the velocity and the movement of the thermofusible material can be monitored, and the exist of the thermofusible material can be detected. Therefore, the operation of the equipment is completely monitored. On the other hand, since the optical detection mechanism is disposed between the feeding wheel and the ratchet and the idler, no matter where an abnormal issue occurs, the abnormal issue can be detected and the equipment can be appropriately stopped. The print will resume after the abnormal issue is removed. Meanwhile, the problems and the drawbacks of reprinting caused by the failure of the previous print is avoided. Not only the time is economized, but also the efficiency of operation is enhanced While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An extrusion device of a three-dimensional printer, comprising: a ratchet;
   a spray head disposed adjacent to the ratchet;
   an idler disposed adjacent to the ratchet, wherein a thermofusible material is jointly held by the ratchet and the idler, and the thermofusible material is pressurized by the idler so as to be tightly contacted with the ratchet;
   a feeding wheel, wherein the thermofusible material is provided to the spray head through the ratchet and the idler by the feeding wheel; and an optical detection mechanism, comprising:
   a guiding element disposed between the ratchet and the feeding wheel along a feeding path; and an optical detecting assembly disposed adjacent to the guiding element, wherein when the ratchet is rotated, the thermofusible material is driven through the guiding element, the ratchet and the idler by the friction force between the ratchet and the thermofusible material and then extruded out by the spray head, and wherein the thermofusible material is guided by the guiding element so as to be partially disposed on a detecting area, a waveband light is emitted to the detecting area by the optical detecting assembly, and the image produced by the reflection of the waveband light, which is reflected by the detecting area, is detected by the optical detecting assembly, wherein the optical detecting assembly comprises:
a solid-state light-emitting element emitting the waveband light; a first lens disposed between the solid-state light-emitting element and the guiding element for focusing the waveband light on the detecting area; a detecting element disposed on one side of the detecting area reflecting the waveband light relative to the solid-state light-emitting element; and a second lens disposed between the detecting element and the guiding element for collecting lights toward the detecting element, wherein the image produced by the reflection of the waveband light reflected by the detecting area is detected by the detecting element.

2. The extrusion device of a three-dimensional printer according to claim 1, wherein the solid-state light-emitting element, the first lens, the detecting element and the second lens are integrated as an optical mouse module.

3. The extrusion device of a three-dimensional printer according to claim 1, wherein the guiding element has a penetration groove, and the thermofusible material is penetrated through the penetration groove and limited by the penetration groove so as to be partially disposed on the detecting area.

4. The extrusion device of a three-dimensional printer according to claim 3, wherein the guiding element further has a slot, and the slot is partially formed on the penetration groove for commonly defining the detecting area with the penetration groove.

5. The extrusion device of a three-dimensional printer according to claim 4, wherein the guiding element further has a first portion, a second portion and a connect portion, the penetration groove is penetrated through the first portion, the connect portion and the second portion in sequence, the slot is formed on the connect portion, and the detecting area is located on the center of an overlapped portion of the connect portion, the penetration groove and the slot.

6. The extrusion device of a three-dimensional printer according to claim 5, wherein the optical detecting assembly is simultaneously fixed on the first portion and the second portion of the guiding element.

7. An optical detection mechanism of an extrusion device of a three-dimensional printer, the extrusion device comprising a ratchet, a spray head, an idler and a feeding wheel, the spray head and the idler disposed adjacent to the ratchet, a thermofusible material jointly held by the idler and the ratchet and provided to the spray head through the ratchet and the idler by the feeding wheel, the optical detection mechanism comprising:
   a guiding element disposed between the ratchet and the feeding wheel along a feeding path; and an optical detecting assembly disposed adjacent to the guiding element, wherein the thermofusible material is guided by the guiding element so as to be partially disposed on a detecting area, a waveband light is emitted to the detecting area by the optical detecting assembly, and the image produced by the reflection of the waveband light, which is reflected by the detecting area, is detected by the optical detecting assembly, wherein the optical detecting assembly comprises:
   a solid-state light-emitting element emitting the waveband light;
   a first lens disposed between the solid-state light-emitting element and the guiding element for focusing the waveband light on the detecting area;
   a detecting element disposed on one side of the detecting area reflecting the waveband light relative to the solid-state light-emitting element; and
   a second lens disposed between the detecting element and the guiding element for collecting lights toward the detecting element, wherein the image produced by the reflection of the waveband light reflected by the detecting area is detected by the detecting element.

8. The optical detection mechanism according to claim 7, wherein the guiding element has a penetration groove, and the thermofusible material is penetrated through the penetration groove and limited by the penetration groove so as to be partially disposed on the detecting area.

* * * * *